US008145229B1

(12) United States Patent
Mansour

(10) Patent No.: US 8,145,229 B1
(45) Date of Patent: Mar. 27, 2012

(54) SYSTEM AND METHOD FOR IMPROVING SECTOR THROUGHPUT IN A BROADBAND DATA-OPTIMIZED MULTI-CARRIER ENVIRONMENT

(75) Inventor: Nagi A. Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 669 days.

(21) Appl. No.: 11/741,526

(22) Filed: Apr. 27, 2007

(51) Int. Cl.
*H04W 4/00* (2009.01)
*H04W 72/00* (2009.01)
*H04L 12/28* (2006.01)
*H04J 3/16* (2006.01)

(52) U.S. Cl. .................. 455/452.2; 455/452.1; 370/329; 370/431; 370/437

(58) Field of Classification Search .................. 370/352, 370/335, 464, 329, 431, 437; 455/562.1, 455/452.1, 452.2
See application file for complete search history.

(56) References Cited

U.S. PATENT DOCUMENTS

| | | | | |
|---|---|---|---|---|
| 6,278,701 | B1 | 8/2001 | Ayyagari et al. | |
| 6,353,626 | B1 | 3/2002 | Sunay et al. | |
| 6,751,444 | B1 | 6/2004 | Meiyappan | |
| 6,810,070 | B1 | 10/2004 | Sourour | |
| 6,859,446 | B1 | 2/2005 | Gopalakrishnan et al. | |
| 6,901,046 | B2 | 5/2005 | Hsu et al. | |
| 6,990,324 | B2 | 1/2006 | Laroia et al. | |
| 7,103,350 | B2 | 9/2006 | Au et al. | |
| 7,457,641 | B1 * | 11/2008 | Legnain et al. | 455/562.1 |
| 2005/0207367 | A1 * | 9/2005 | Onggosanusi et al. | 370/315 |
| 2006/0274712 | A1 * | 12/2006 | Malladi et al. | 370/345 |
| 2007/0201438 | A1 * | 8/2007 | Yoon et al. | 370/352 |
| 2007/0218918 | A1 * | 9/2007 | Liu et al. | 455/452.1 |

* cited by examiner

*Primary Examiner* — Jinsong Hu
*Assistant Examiner* — Opiribo Georgewill

(57) ABSTRACT

A multi-carrier base transceiver system is configured to improve sector throughout by selectively allocating available carriers to subscribers based on Quality of Service (QoS) requirements, as well as the prevailing radio frequency (RF) environment for the subject subscriber. In one embodiment, the base transceiver may provide three separate carriers, each represented as a forward link channel in which individual time slots are separately allocated according to a scheduling protocol. Once the QoS requirements and prevailing RF conditions are determined, a number of the available carriers are allocated such that the desired throughput is achieved using a fewest number of carriers.

13 Claims, 6 Drawing Sheets

200
225
PSTN
220
MSC
215
Multicarrier BSC
PCF
235
205
Multicarrier BTS
SU
210
260
INTERNET
230
PDSN
PCRF
255
AAA
250
Home Agent
240

300
From PCF/PDSN
CDMA2000 1xEV-DO Messaging Data
CDMA2000 1xEV-DO Control Data
CDMA2000 1xEV-DO CONTROL
SCHEDULER
320
310
Messaging Data
Messaging Data
Messaging Data
330
CDMA2000 1xEV-DO Encoder/Modulator
340
CDMA2000 1xEV-DO Encoder/Modulator
350
CDMA2000 1xEV-DO Encoder/Modulator
Carrier #1
Carrier #2
Carrier #3
Transmitter
360
370

400
405
410
RECEIVER
CDMA2000 1xEV-DO Demodulator/Decoder (Carrier #1)
420
CDMA2000 1xEV-DO Demodulator/Decoder (Carrier #2)
425
CDMA2000 1xEV-DO Demodulator/Decoder (Carrier #3)
430
TRANSMITTER
455
CONTROL PROCESSOR
435
Data Processing Logic
440
CDMA2000 1xEV-DO Control Logic
450
User Interface
445

$540_1$
$540_2$
$540_3$
$540_4$
$540_5$
SU 1
SU 2
SU 3
SU 4
SU 5
510
520
530
SU 4
SU 2
SU 1
SU 5
SU 3
SU 1
SU 5
SU 4
SU 1
Time
CARRIER #1
CARRIER #2
CARRIER #3
500

600
START
Detect Subscriber
605
QoS?
610
High
Med
Low
RF Conditions?
620
Med
Ba
Good
1 Carrier
622
2 Carriers
624
1 Carrier
626
RF Conditions?
630
Med
Ba
Good
2 Carriers
632
3 Carriers
634
1 Carrier
636
RF Conditions?
640
Med
Ba
Good
2 Carriers
642
3 Carriers
644
2 Carriers
646

SYSTEM AND METHOD FOR IMPROVING SECTOR THROUGHPUT IN A BROADBAND DATA-OPTIMIZED MULTI-CARRIER ENVIRONMENT

FIELD OF THE INVENTION

The present invention relates generally to wireless communications systems and more particularly to systems and methods for improving sector throughput in a broadband data-optimized multi-carrier environment based on selective carrier allocation.

BACKGROUND OF THE INVENTION

CDMA2000 is a third-generation (3G) wireless communications standard that uses Code Division Multiple Access (CDMA) to facilitate wireless communications between CDMA base stations and mobile devices. Variants of CDMA2000 include CDMA2000 1x, which provides both voice and data services over a standard CDMA channel, and CDMA2000 Evolution Data-Optimized (1xEV-DO) which is optimized for High Data Rate (HDR) capability. CDMA2000 1xEV-DO Revision B defines a multi-carrier system providing peak transmission rates of 73.5 Mbps in the forward link and 27 Mbps in the reverse link by aggregating multiple 1.25 MHz carrier within 20 MHz of bandwidth. Current versions of the CDMA2000 standards are published and approved by the Telecommunications Industry Association and the International Telecommunication Union.

FIG. 1 illustrates exemplary forward link channel structures for use in a DO multi-carrier system. As shown, base transceiver 100 provides three CDMA2000 1xEV-DO carriers, which are optimized for high speed data communications. The three depicted CDMA2000 1xEV-DO carriers include forward link channels 110, 120 and 130, respectively. Each forward link channel 110, 120 and 130 includes time slots allocated for pilot channels for system acquisition, and control channels for providing control information to mobile stations. In operation, the mobile station 140 separately acquires the pilot and control channels for each 1xEV-DO carrier to set up wireless communications on the respective carrier.

The base transceiver 100 allocates wireless resources, such as time slots on the 1xEV-DO carriers, to the mobile station 140 based on the mobile user's Quality of Service (QoS) characteristics. A mobile station with high QoS characteristics may be given priority over other mobile stations to ensure data communications to the mobile station are delivered at a high data rate, for example by assigning additional time slots on forward link channels 110, 120 and 130. In addition, subscribers in good radio frequency (RF) conditions are served first under current scheduling protocols.

However, there is currently no way to service a high QoS subscriber who happens to be in a bad RF environment without materially decreasing sector throughput for the servicing base transceiver system (e.g., base transceiver 100). As such, there is a need for a system and method for improving sector throughput in a broadband data-optimized multi-carrier environment.

SUMMARY OF THE INVENTION

The present invention is a system and method for improving sector throughput in a data-optimized multi-carrier operation. In one embodiment a method for data-optimized multi-carrier wireless communications comprises detecting a wireless subscriber unit within a coverage area, determining a QoS for the wireless subscriber unit, and determining an RF condition for the wireless subscriber unit. The method further includes selecting a number of data-optimized carriers from a set of available data-optimized carriers to allocate to the wireless subscriber unit based on the QoS and the RF condition.

In another embodiment, the QoS may be determined by accessing profile information for the wireless subscriber unit from a network database. In addition, the RF condition may be determined based on signal-to-noise ratio information received from the wireless subscriber unit.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
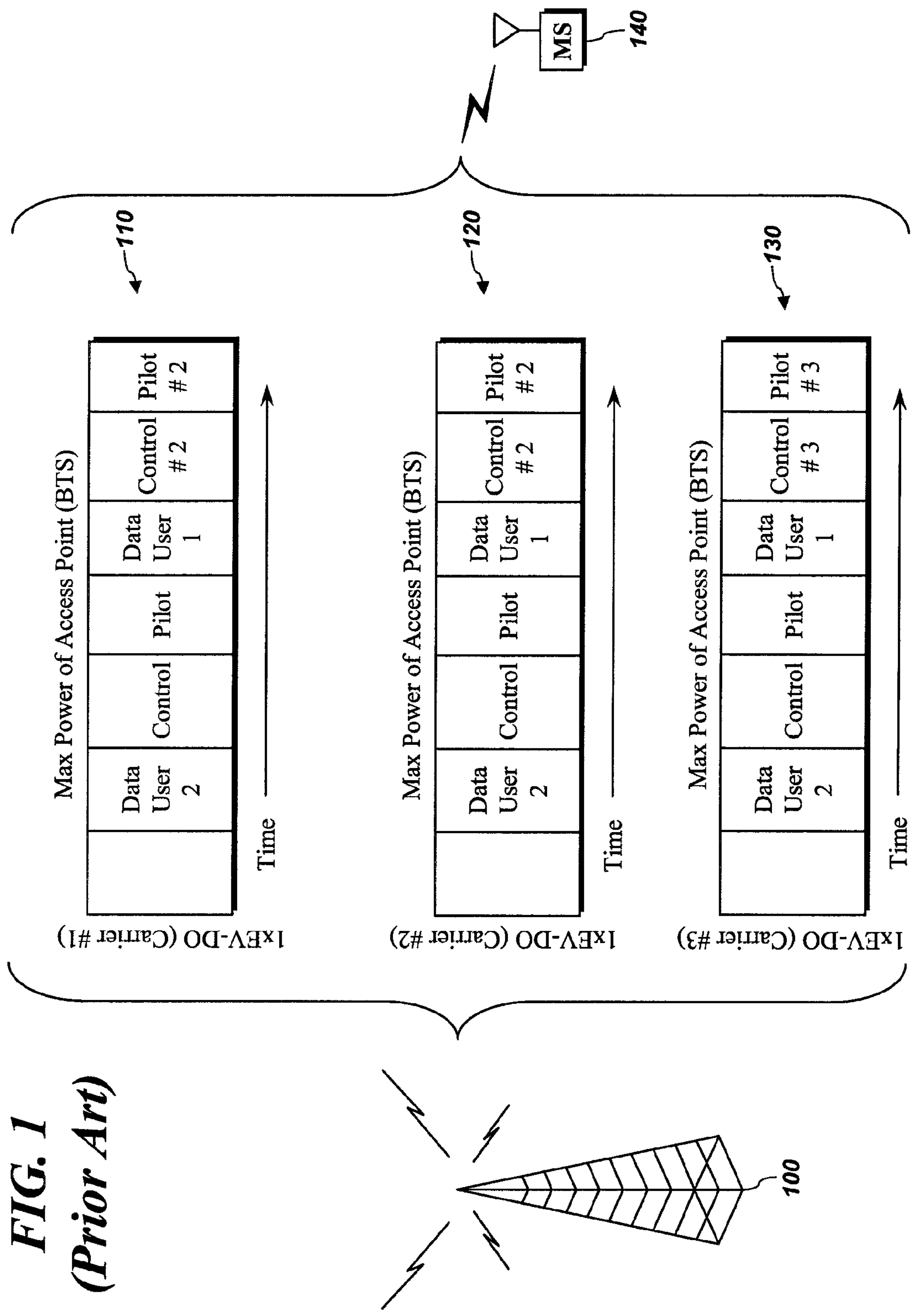
FIG. 1 illustrates forward link channel structures of a prior art multi-carrier base transceiver system.

As disclosed and claimed herein, one aspect of the invention is to improve sector throughput in a data-optimized multi-carrier environment based on selective or dynamic channel allocation. To that end, one aspect of the invention is to improve sector throughout for a given wireless base station transceiver by selectively allocating available carriers to subscribers based on QoS requirements, as well as the prevailing RF environment for the subject subscriber. In one embodiment, the base transceiver may provide three data-optimized (DO) carriers, such as CDMA2000 1xEV-DO carriers, each represented as a forward link channel in which individual time slots are separately allocated according to a scheduling protocol.

In one embodiment, subscriber QoS requirements may be determined by accessing the subscriber profile information. In addition, the prevailing RF condition may be determined from SNR data reported to the servicing base station system by the subject subscriber unit.

The number of carriers allocated to the subject subscriber may be proportional to the QoS requirement, but inversely proportional to the prevailing RF conditions. In other words, the higher the QoS requirement, the more carriers will be allocated to the subject subscriber. In contrast, the better the prevailing RF conditions, the lower the number of carriers needed to achieve the desired throughput. Thus, rather than automatically allocate all available carriers to the highest QoS subscribers, for example, one aspect of the invention may be to recognize that a lower number of carriers could equally be used to achieve the desired output when the prevailing RF conditions otherwise permit. In this fashion, the overall sector throughout is improved since resources are not being unnecessarily allocated.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

Figure 2:
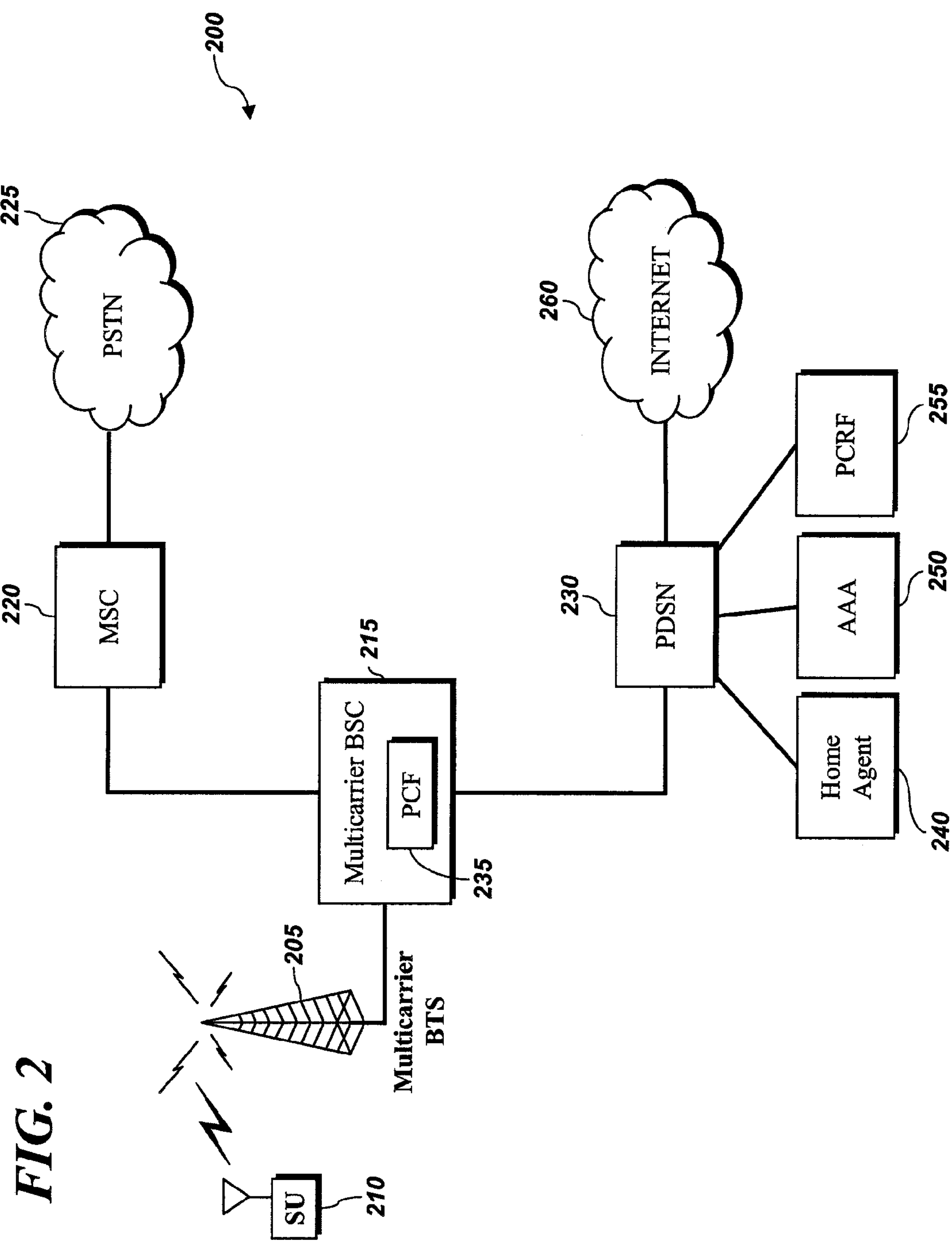
FIG. 2 is an embodiment of a DO multi-carrier wireless network in accordance with an embodiment of the present invention.

Referring now to FIG. 2, depicted is an exemplary DO multi-carrier wireless communications system 200 configured to implement one or more aspects of the invention. In particular, system 200 includes at least one base transceiver system (BTS) 205 adapted to provide wireless communications services to a plurality of subscriber units, such as subscriber unit 210, within a geographical coverage area serviced by the BTS 205. The subscriber unit 210 is adapted to communicate with the BTS 205 by exchanging data packets according to the CDMA20000 1xEV-DO standards as described herein. Persons having ordinary skill in the art will appreciate that in alternate embodiments the wireless communications system 200 may support other DO multiple-access wireless communications protocols and technologies such as other CDMA technologies, Orthogonal Frequency Division Multiplexing (OFDM), Multiple Access Advanced Mobile Phone Service (AMPS), Global System for Mobile Communications (GSM), General Packet Radio Services (GPRS), and Push-to-Talk over Cellular (PoC) technologies.

The wireless communications system 200 facilitates at least one mode of communication such as interconnect, push-to-talk (PTT), email, short messaging service (SMS), multimedia messaging service (MMS) and packet data communications. The subscriber unit 210 may be any device adapted for wireless communication with the BTS 205, such as a mobile phone, pager, personal digital assistant (PDA), a Personal Computer Memory Card International Association (PCMCIA) card, or portable computer. It should be appreciated that the BTS 205 and the subscriber unit 210 may be adapted to communicate on multiple DO carrier frequencies—e.g., a first carrier providing voice and data communications using CDMA2000 1x and a second carrier providing packet data communications using CDMA20000 1xEV-DO. In one embodiment, subscriber unit 210 may be allocated one or more of such DO carriers based on the prevailing RF conditions. As will be described in more detail below, the amount of bandwidth allocated to a given subscriber may be selected based on RF conditions, thereby increasing overall sector throughput.

A multi-carrier base station controller (BSC) 215 manages wireless communications for the BTS 205 and routes CDMA2000 1x voice communications to a mobile switching center 220 which manages calls between subscriber units in the wireless network 200 and between the subscriber unit 210 and at least one communications network, such as a public switched telephone network (PTSN) 225. The BSC 215 routes 1xEV-DO communications to a packet data serving node (PDSN) 230. A packet control function (PCF) 235 provides an interface between the BSC 215 and the PDSN 230, manages packet data sessions and wireless resources, and controls data flow from the PDSN 230 as wireless resources become available.

The PDSN 230 routes data packets between the PCF 235, on the one hand, and a home agent (HA) 240, an authentication, authorization and accounting (AAA) server 250 and a Policy and Charging Rules Function (PCRF) 255. The PDSN may alternatively route the data packets between the PCF 235 and a packet data network (not shown), to which the HA 240, AAA server 250 and PCRF 255 may be connected. In addition, the PDSN 230 may also provide access to an external network, such as the Internet 260. It will be appreciated by those having ordinary skill in the art that the wireless network 200 of FIG. 2 is exemplary and that other components, configurations and technologies may be implemented consistent with the spirit and scope of the present invention.

Figure 3:
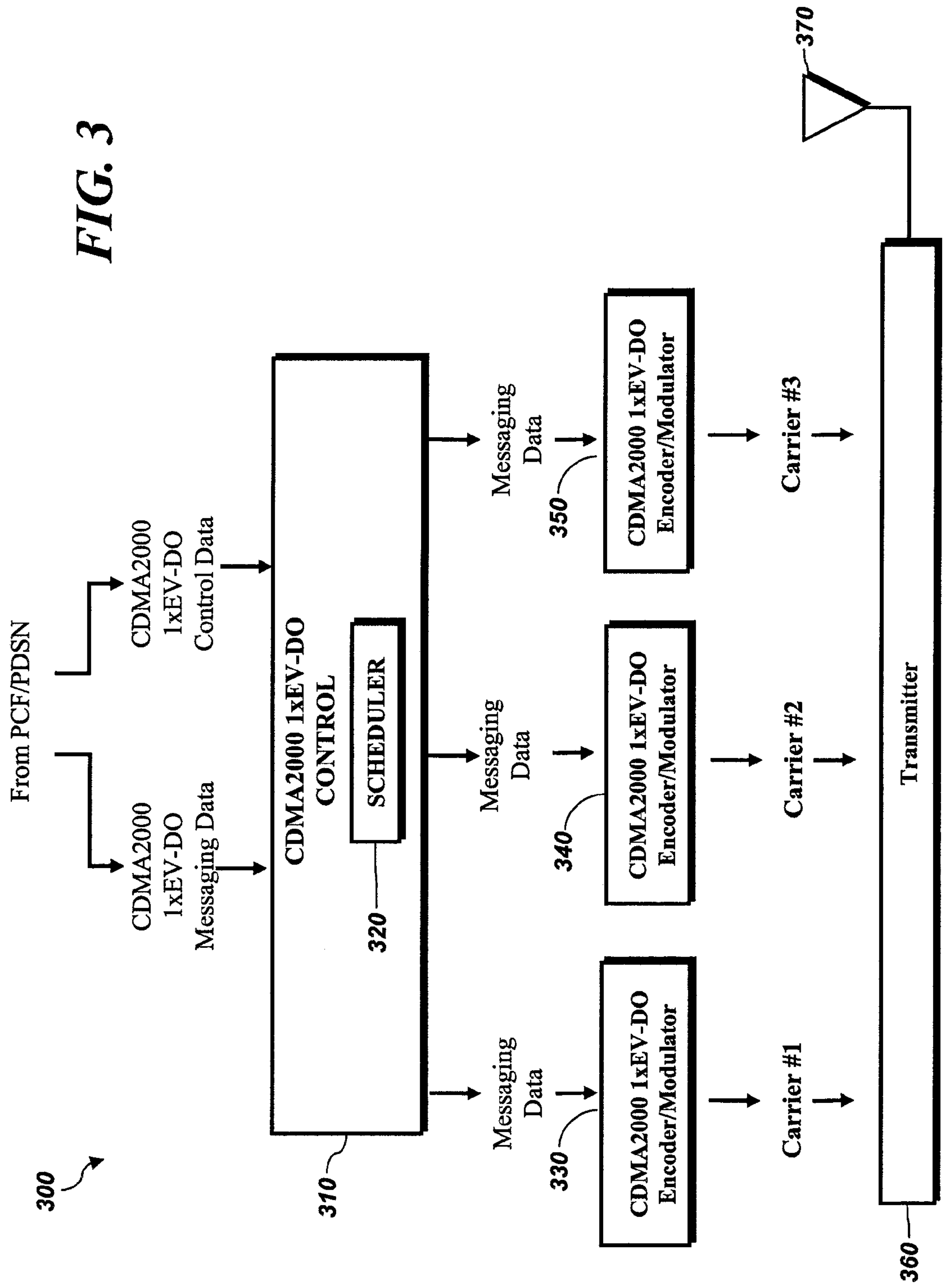
FIG. 3 illustrates logical components and data flow in a base transceiver system in accordance with an embodiment of the present invention.

Referring now to FIG. 3, depicted is one embodiment of the forward link logic of the multi-carrier BTS 300 configured in accordance with the principles of the invention. In particular, BTS 300 includes CDMA2000 1xEV-DO Control Logic 310 for processing control and messaging data received from a packet data serving node (e.g., PDSN 230 of FIG. 2). Scheduling logic 320 allocates resources on the CDMA 1xEV-DO carriers and routes messaging data to appropriate traffic channels. The CDMA2000 1xEV-DO forward link may transmit time division multiplexed data, in which encoding and modulation circuitry 330, 340 and 350, for each respective 1xEV-DO carrier, encodes pilot channel and messaging data into CDMA signals for HDR transmission. Encoding and modulation circuitry 330, 340 and 350 encodes the time division multiplexed data into CDMA signals for transmission via a transmitter 360 and antenna 370.

Scheduling logic 320 may allocate resources (e.g., time slots) in accordance with Quality of Service (QoS) characteristics and channel conditions. With respect to channel conditions, subscriber units (e.g., subscriber unit 210) may measure the Carrier-to-Interference-plus-Noise Ratio (CINR) on the carrier pilot for every slot, e.g., 1.667 ms. The subscriber unit may then report the signal-to-noise ratio (S/N) back to the base station system 300 as an indication of the prevailing RF conditions. The base station transceiver 300 may then allocate bandwidth on the forward links according to a scheduling protocol taking into account both the QoS characteristics, as well as the channel conditions for each subscriber. In addition thereto, and as will be described in more detail below, the number of DO carriers allocated to the given subscriber may be selectively or dynamically adjusted based on not only the subscriber's QoS characteristics, but also on the prevailing RF conditions. That is, not only are time slots within a DO carrier allocated based on QoS and/or RF conditions as is typically the case, but the actual number of DO carriers servicing a particular subscriber may similarly be selected.

While the multi-carrier BTS 300 has been depicted as providing three CDMA 1xEV-DO carriers, it should equally be appreciated that more or fewer carriers may equally be provided in accordance with the principles of the invention. Moreover, which each CDMA2000 1xEV-DO carrier may comprises a bandwidth of 1.25 MHz, other data transmission protocols may be divided into larger or smaller bands. For example, Wideband CDMA (W-CDMA) is comprised of 5 MHz bands and may be used in place of the CDMA2000 1xEV-DO carriers of FIG. 3.

Figure 4:
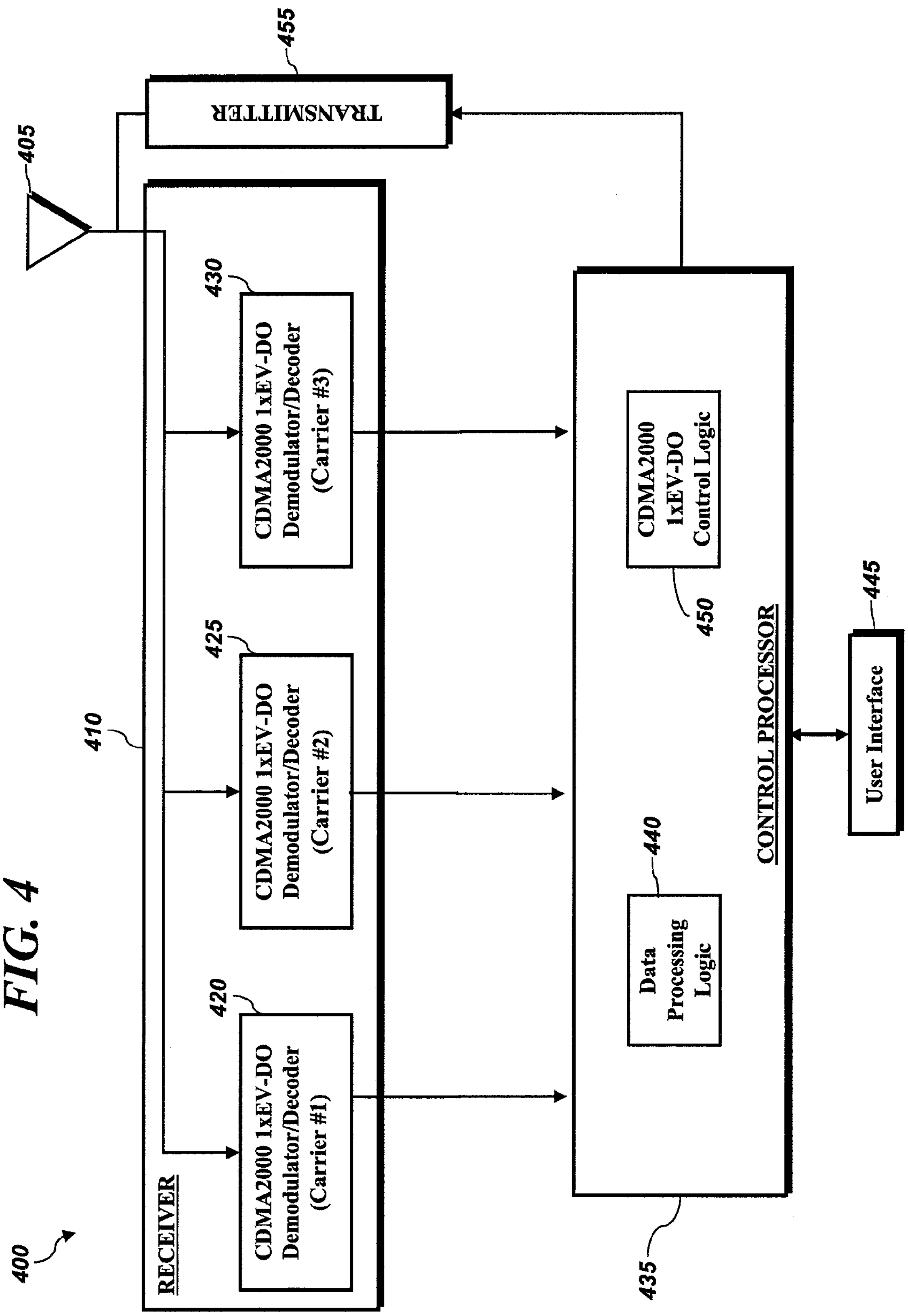
FIG. 4 illustrates logical components of a subscriber unit in accordance with an embodiment of the present invention.

Referring to FIG. 4, a logical representation of a multi-carrier subscriber unit 400 in accordance with an embodiment of the present invention will be described. An antenna 405 receives the radio frequency signals transmitted from a base transceiver system (e.g., BTS 300 of FIG. 3). A receiving circuitry 410 includes circuitry for demodulating and decoding the received signals into separate channels associated with each of the DO carrier frequencies. In the exemplary embodiment, the receiver includes logic and circuitry, 420 and 425 and 430, for separating out and decoding the logical channels for the pilot and traffic channels of carrier # 1, carrier #2 and carrier #3, respectively.

A control processor 435 includes a data application 440 adapted to process data received through the high speed data connection. In one embodiment, the data application 440 includes an Internet web browser application and the traffic channels deliver web data for display on the user interface 445. In alternate embodiments, the data application 440 includes a voice-over-IP application such as a push-to-talk application. The control processor 435 also includes control logic and circuitry for controlling the radio interfaces on the subscriber unit 400 for communication with a base transceiver system. CDMA2000 1xEV-DO control logic 450 receives and processes data from the three CDMA2000 1xEV-DO carriers (i.e., carriers #1, #2 and #3), respectively.

A transmitter 455 includes circuitry for modulating, upconverting and amplifying the baseband signals to be carried on RF signals across a wireless communications link through the antenna 405. The transmitter 455 is adapted to transmit signals to a base transceiver system using reverse links on the CDMA2000 1xEV-DO carriers. In one embodiment, the receiver 410, control processor 435 and transmitter 455 may be implemented as a single processor with program memory storing program logic or a combination of processors and dedicated circuitry including application specific integrated circuits (ASICs) and digital signal processors.

In one embodiment, the subscriber unit 400 is a mobile telephone, and the user interface 445 includes circuitry and components for providing a user of the subscriber unit 400 with a numeric keypad for user input of telephone numbers and other information, and a visual display.

As with the multi-carrier BTS 300 of FIG. 3, the subscriber unit 400 of FIG. 4 may similarly include logic and circuitry for processing more or fewer than three carrier frequencies, and may similarly be configured to communicate in accordance with other data communication protocols, such as W-CDMA.

Heretofore, base station transceivers would service mobile subscriber based on the maximum data rate, and therefore always use all available DO carriers for high QoS subscribers, for example. Similarly, low QoS subscribers were always allocated some lower amount of bandwidth. However, the DO carrier frequencies (and not just time slots within carriers) may be individually allocated or de-allocated by the servicing base station transceiver (e.g., scheduling logic 320 of FIG. 3), one aspect of the invention is to use selective or dynamic carrier allocation to improve overall sector throughput. In short, the amount of bandwidth (represented as the number of individual DO carriers) allocated to a given subscriber may be dynamically adjusted to take into account the subscribers QoS, as well as the prevailing RF conditions, thereby increasing the overall sector throughout. In another embodiment, a desired throughput for a given BTS (e.g., BTS 300 of FIG. 3) may similarly be used in selectively allocating one or more DO carriers.

In one embodiment, QoS characteristics and/or channel condition may still be used to determine scheduling priorities, as described above with reference to FIG. 3 and as performed by scheduling logic 320. However, irrespective of the time slot allocation chosen by the current scheduling protocol, individual DO carrier (e.g., carrier #1, #2 and/or #3) allocation may be based, at least in part, on RF conditions.

Figure 5:
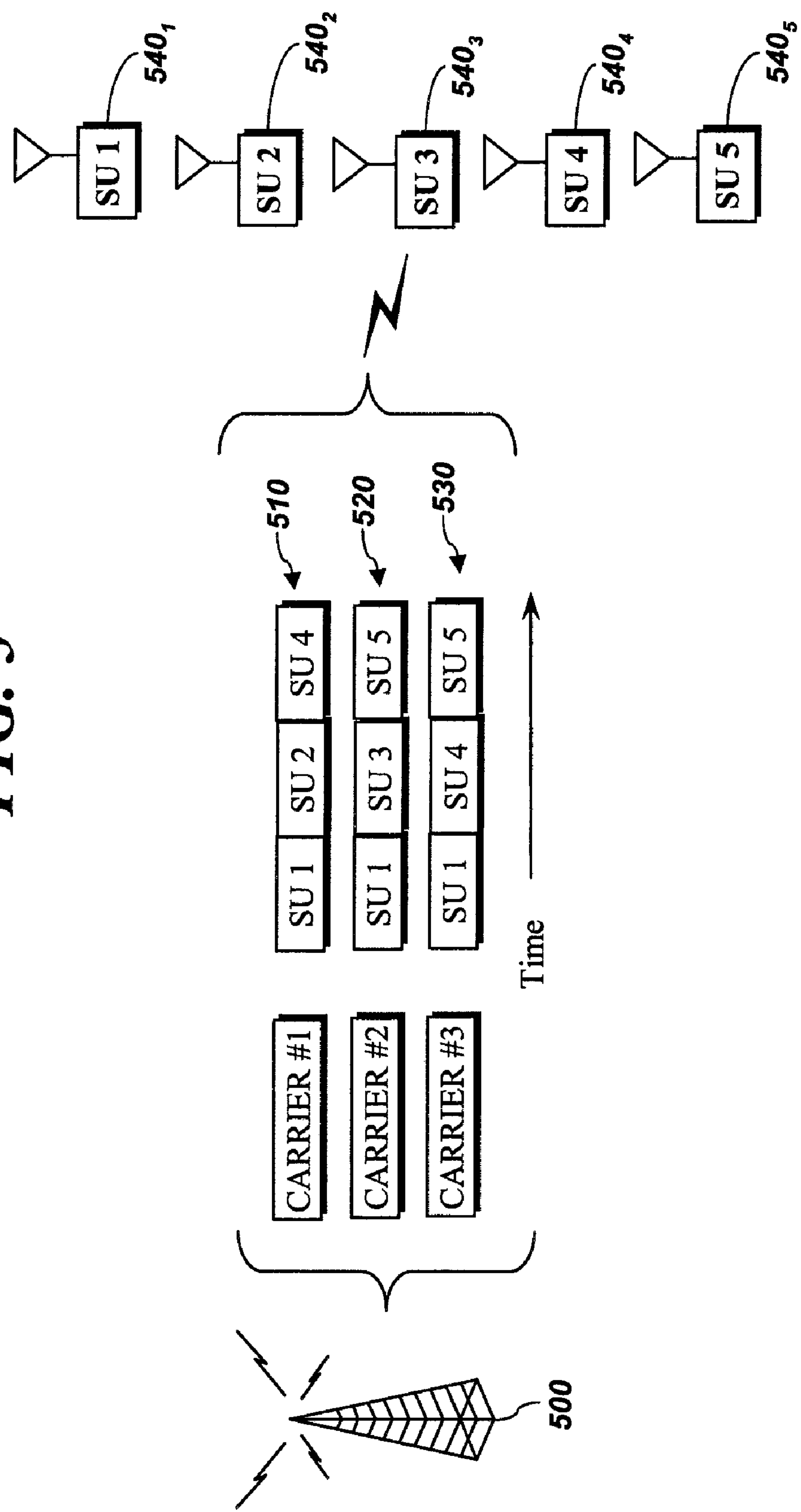
FIG. 5 illustrates forward link channel structures of a DO multi-carrier base transceiver system in accordance with one embodiment of the invention.

To that end, FIG. 5 depicts one embodiment of a forward link channel structure for use in a DO multi-carrier system, in accordance with one embodiment of the invention. In particular, FIG. 5 illustrates a base transceiver 500 which provides three CDMA2000 1xEV-DO carriers, which are optimized for high speed data communications. The three depicted CDMA2000 1xEV-DO carriers include forward link channels 510, 520 and 530, respectively. While not shown, it should be appreciated that each forward link channel 510, 520 and 530 includes time slots allocated for pilot channels for system acquisition, and control channels for providing control information to mobile stations. In operation, the subscriber units $\mathbf{540}_1$-$\mathbf{540}_5$ separately acquire the pilot and control channels for each 1xEV-DO carrier (i.e., Carrier #1, #2 and #3) to set up wireless communications on the respective carrier.

The base transceiver 500 allocates wireless resources, such as time slots on the 1xEV-DO carriers to service the various the subscriber units $\mathbf{540}_1$-$\mathbf{540}_5$ based on the subscriber units' QoS characteristics. In addition, however, one aspect of the invention is also to selectively allocate the carriers #1, #2 and #3 based on both subscriber QoS characteristics, as well as the prevailing RF conditions. To that end, Table 1 below provides exemplary parameters for each of the subscriber units $\mathbf{540}_1$-$\mathbf{540}_5$ which may be used in selectively or dynamically allocating DO carriers in accordance with the principles of the invention.

TABLE 1

| Subscriber Unit Parameters | | | | |
|---|---|---|---|---|
| SU 1 | SU 2 | SU 3 | SU 4 | SU 5 |
| Bad RF High QoS | Good RF Low QoS | Good RF Low QoS | Bad RF Low QoS | Good RF High QoS |

In one embodiment, the subscriber units $540_1$-$540_5$ QoS may be determined by accessing the subscriber's profile information contained, for example, in a AAA server (e.g., AAA server 250 of FIG. 2) or PCRF (e.g., PCRF 255 of FIG. 2). In addition, the prevailing RF condition may be determined from the fact that subscriber units $540_1$-$540_5$ may measure CINR on the carrier pilot and report the SNR back to the base station system 500 as an indication of the prevailing RF conditions. Based on these parameters, the base station transceiver system 500 may allocate one or more of the available DO carriers to each of the subscriber units $540_1$-$540_5$.

As shown in Table 1 above, subscriber units $540_1$ has a high QoS but poor RF conditions. In this case, all three DO carriers may be allocated to the subscriber in order to be able to meet the subscriber's QoS requirements under the prevailing RF conditions. That is, subscriber unit $540_1$ is allocated time slots in all three forward link channels 510, 520 and 530.

In addition, subscriber units $540_2$ and $540_3$ both have good RF conditions, but a low QoS requirement (see Table 1 above). As such, they can be allocated a lower number of carriers and still satisfy their QoS requirements. As such, subscriber unit $540_2$ is allocated time slots in only forward link channel 510, while subscriber unit $540_3$ is allocated time slots in only forward link channel 520.

Continuing to refer to FIG. 5, subscriber unit $540_4$ has a poor RF condition and a low QoS requirement, as shown in Table 1 above. As such, an additional carrier may be allocated in order to satisfy its QoS requirement. To that end, subscriber unit $540_4$ is allocated time slots in forward link channels 510 and 530, as shown in FIG. 5. Finally, subscriber unit $540_5$ has a good RF condition and a high QoS requirement (see Table 1 above). As such, subscriber unit $540_5$ will not need all three DO carriers in order to satisfy its QoS requirement and, as such, may be allocated time slots in forward link channels 520 and 530 only. Note this is in contrast to the other high QoS subscriber (i.e., subscriber units $540_1$), which received time slots on all three DO carriers due to the poor RF conditions.

Figure 6:
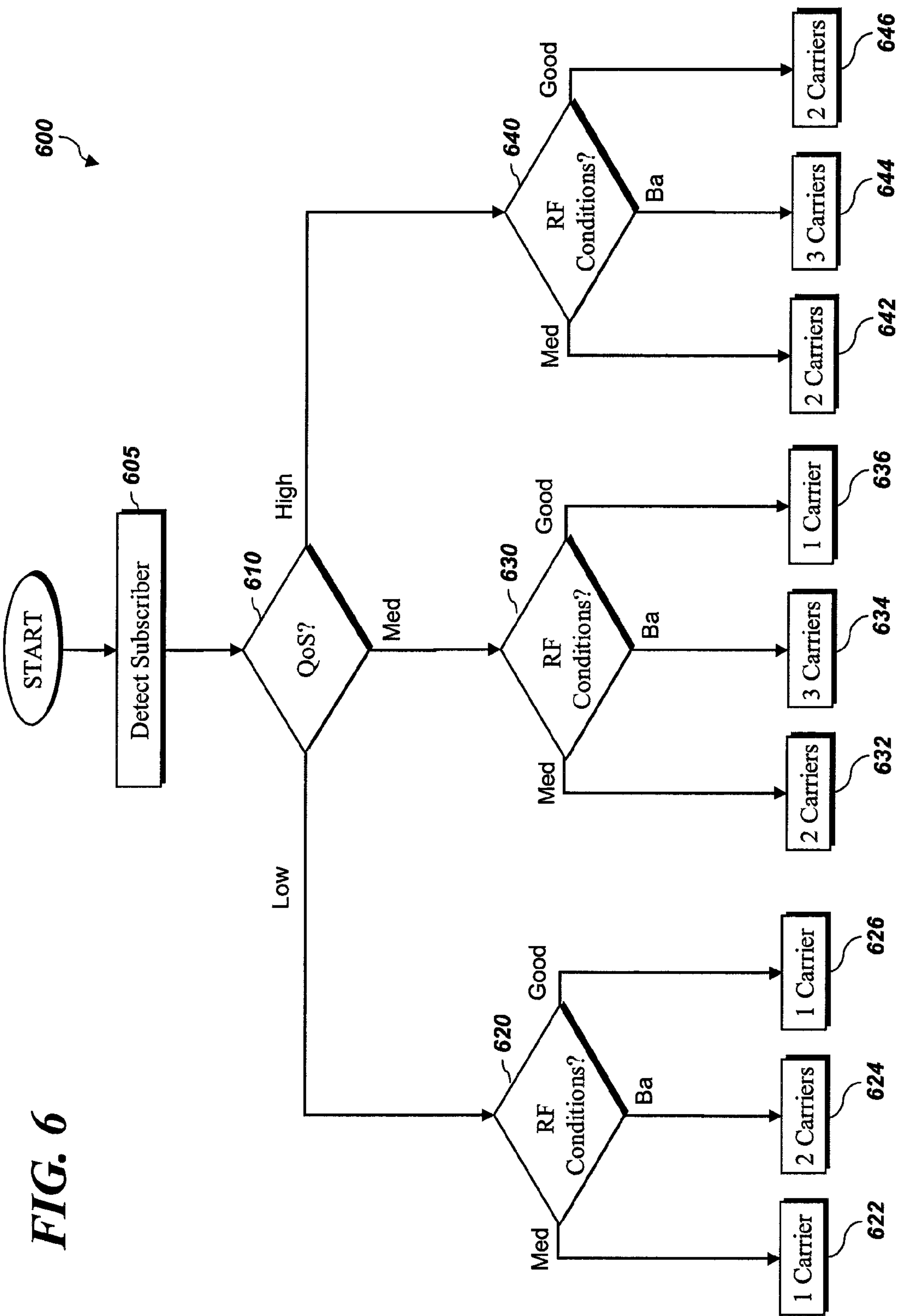
FIG. 6 a process for selective allocation of available DO carriers, according to one embodiment.

Referring now to FIG. 6, depicted is one embodiment of a process 600 for selectively allocating DO carriers to subscriber units based on QoS and prevailing RF conditions. In one embodiment, process 600 may be carried out by a base station transceiver, such as BTS 300. Moreover, while process 600 assumes that there are three DO carriers available, it should equally be appreciated that more or fewer DO carriers may be used.

Process 600 begins at block 605 with the detection of a subject subscriber unit. In one embodiment, this detection operation may include the subscriber unit registering with the base station transceiver upon entering a coverage area for the base station transceiver, for example. As is generally known, this registering process may include a series of short data exchanges between the subscriber unit and the base station transceiver.

Thereafter, at block 610 a determination may be made as to the subject subscriber's QoS. In one embodiment, this information may be determined by accessing the subscriber's profile information contained, for example, in an AAA server (e.g., AAA server 250 of FIG. 2) or PCRF (e.g., PCRF 255 of FIG. 2). As shown, subscriber QoS may be either low, medium or high. In one embodiment, low QoS may be associated with a data rate of between about 2 and 3 Mb/s. Medium QoS may be associated with a data rate of between about 3 and 6 Mb/s. And high QoS may be associated with a data rate of between about 6 and 9 Mb/s. It should of course be appreciated that additional categories of QoS may be used and the data rates associated therewith may be different than the exemplary ranges provided herein.

Once the QoS has been determined, process 600 may continue to one of decision block 620, 630 or 640, depending on the determined QoS. For example, when the QoS requirement is low, process 600 may move to block 620. A medium QoS determination will cause process 600 to move to block 630, and a high QoS determined will move process 600 to block 640.

Regardless, process 600 may then determine the prevailing RF condition at either block 620, 640 or 640, as the case may be. In one embodiment, the prevailing RF condition may be determined from SNR reported back to the base station system by the subscriber unit.

Continuing to refer to FIG. 6, the RF condition for a low QoS requirement is determined at block 620 to be either good, bad or medium. It should of course be appreciated that, as with the QoS determination of block 610, there may be more or fewer categories of RF conditions. In any event, the default or standard number of DO carriers allocated to a low QoS subscriber is one DO carrier, according to the embodiment of FIG. 6. To that end, the subscriber will be allocated only one DO carrier for both good and medium RF conditions at blocks 626 and 622, respectively. However, if the low QoS subscriber is in a poor RF environment, then it may be necessary to allocate an additional DO carrier to that subscriber in order to satisfy the desired throughout. To that end, the subject subscriber may be allocated two DO carriers at block 624.

When the subject subscriber of process 600 is a medium QoS subscriber, process 600 will move to block 630 where the RF condition may be determined again as either good, bad or medium. In this case, the subscriber will again be allocated only one DO carrier for good RF conditions at block 636. However, since the desired throughout is higher due to the higher QoS requirement, an additional DO carrier is allocated to the subscriber for only medium RF conditions (block 632). Similarly, a poor RF environment may require that yet another DO carrier be allocated to the subject subscriber in order to satisfy the medium QoS requirement. To that end, the subscriber may be allocated time slots on all three DO carriers at block 634.

Finally, when the subject subscriber of process 600 is a high QoS subscriber, process 600 will move to block 640 where the RF condition may be determined again as either good, bad or medium. Due to the high QoS requirement, no single DO carrier will ever be sufficient to satisfy the subscribers QoS requirement. As such, in most cases the subscriber may be allocated two DO carriers at either block 642 or 646, depending on if the RF environment is good or medium. However, in poor RF conditions, two DO carriers may be insufficient to maintain the desired input. As such, an additional DO carrier is allocated to the subscriber so that time slots on all three DO carriers are available to a high QoS subscriber which happens to be in a bad RF environment at block 644. In this fashion, the overall sector throughout may be improved by more efficiently allocating DO carriers among subscribers.

It should further be appreciated that the initial number of DO carriers allocated to a given subscriber may be dynamically adjusted as the prevailing RF conditions change. For example, a high QoS subscriber which is initially allocated three DO carriers due to the fact that the RF conditions are poor may have one of their DO carriers de-allocated based on an improvement in the prevailing RF environment.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for data-optimized (DO) multi-carrier wireless communications in a base transceiver system comprising the acts of:

detecting a wireless subscriber unit within a coverage area;

determining a Quality of Service (QoS) for the wireless subscriber unit;

determining a radio frequency (RF) condition for the wireless subscriber unit by receiving signal-to-noise ratio information from the wireless subscriber unit;

selecting a number of DO carrier frequencies from a set of available DO carrier frequencies to allocate the selected number of DO carrier frequencies to said wireless subscriber unit based on said QoS and said RF condition, wherein each of the selected DO carrier frequencies includes a forward link channel having a plurality of time slots and at least one of the plurality of time slots is assigned to the wireless subscriber unit for each of the selected number of DO carrier frequencies; and allocating bandwidth of the selected number of DO carrier frequencies based on said QoS and said RF condition, wherein the number of DO carrier frequencies selected is less than the set of available DO carrier frequencies and satisfies the determined QoS for the wireless subscriber unit in said RF condition, and wherein when the determined QoS is a low QoS, one DO carrier is selected as a default number of DO carriers, and when the wireless subscriber unit is in a poor RF environment, an additional DO carrier is allocated to satisfy the determined QoS.

2. The method of claim 1, further comprising transmitting data over the selected number of DO carrier frequencies for reception by the wireless subscriber unit.

3. The method of claim 1, wherein determining the QoS comprises accessing profile information for the wireless subscriber unit from a network database.

4. The method of claim 1, wherein selecting comprises selecting the fewest number of DO carrier frequencies from the set of selected DO carrier frequencies that will satisfy the QoS under the RF condition.

5. A data-optimized (DO) multi-carrier base transceiver system comprising:

first circuitry adapted to detect a wireless subscriber unit within a coverage area of the multi-carrier base transceiver system;

second circuitry adapted to determine a Quality of Service (QoS) for the wireless subscriber unit;

third circuitry adapted to determine a radio frequency (RF) condition for the wireless subscriber unit by receiving signal-to-noise ratio information from the wireless subscriber unit; and fourth circuitry adapted to select a number of DO carrier frequencies from a set of available DO carrier frequencies to allocate the selected DO carrier frequencies to said wireless subscriber unit based on said QoS and said RF condition, wherein each of the selected DO carrier frequencies includes a forward link channel having a plurality of time slots and at least one of the plurality of time slots is assigned to the wireless subscriber unit for each of the selected number of DO carrier frequencies; and fifth circuitry adapted to allocate bandwidth of the selected number of DO carrier frequencies based on said QoS and said RF condition, wherein the number of DO carrier frequencies selected is less than the set of available DO carrier frequencies and satisfies the determined QoS for the wireless subscriber unit in said RF condition, and wherein when the determined QoS is a low QoS, one DO carrier is selected as a default number of DO carriers, and when the wireless subscriber unit is in a poor RF environment, an additional DO carrier is allocated to satisfy the determined QoS.

6. The DO multi-carrier base transceiver system of claim 5, further comprising sixth circuitry to transmit data over the selected number of DO carrier frequencies for reception by the wireless subscriber unit.

7. The DO multi-carrier base transceiver system of claim 5, wherein the second circuitry is adapted to determine the QoS by accessing profile information for the wireless subscriber unit from a network database.

8. The DO multi-carrier base transceiver system of claim 5, wherein the fourth circuitry is adapted to select the number of DO carrier frequencies from the set of available DO carrier frequencies that will satisfy the QoS under the RF condition.

9. The DO multi-carrier base transceiver system of claim 5, wherein one or more of the first, second, third, fourth and fifth circuitry are integrated onto a single circuitry.

10. A computer program product comprising:

a non-transitory processor readable medium having processor executable program code embodied therein for data-optimized (DO) multi-carrier wireless communications, the processor executable program code including:

processor executable program code to detect a wireless subscriber unit within a coverage area;

processor executable program code to determine a Quality of Service (QoS) for the wireless subscriber unit;

processor executable program code to determine a radio frequency (RF) condition for the wireless subscriber unit by receiving signal-to-noise ratio information from the wireless subscriber unit; and processor executable program code to select a number of DO carrier frequencies from a set of available DO carrier frequencies to allocate the selected number of DO carrier frequencies to said wireless subscriber unit based on said QoS and said RF condition, wherein each of the selected DO carrier frequencies includes a forward link channel having a plurality of time slots and at least one of the plurality of time slots is assigned to the wireless subscriber unit for each of the selected number of DO carrier frequencies; and allocating bandwidth of the selected number of DO carrier frequencies based on said QoS and said RF condition, wherein the number of DO carrier frequencies selected is less than the set of available DO carrier frequencies and satisfies the determined QoS for the wireless subscriber unit in said RF condition, and wherein when the determined QoS is a low QoS, one DO carrier is selected as a default number of DO carriers, and when the wireless subscriber unit is in a poor RF environment, an additional DO carrier is allocated to satisfy the determined QoS.

11. The computer program product of claim 10, further comprising processor executable program code to transmit data over the selected number of DO carrier frequencies for reception by the wireless subscriber unit.

12. The computer program product of claim 10, wherein processor executable program code to determine the QoS comprises processor executable program code to access profile information for the wireless subscriber unit from a network database.

13. The computer program product of claim 10, wherein processor executable program code to select comprises processor executable program code to select the fewest number of DO carrier frequencies from the set of available DO carrier frequencies that will satisfy the QoS under the RF condition.

* * * * *